July 9, 1940.     E. ROSENBERG     2,207,304
SECURING CORRECT POLARITY OF GENERATORS
Filed April 12, 1937     2 Sheets-Sheet 1

E. Rosenberg
Inventor

By Glascock Downing & Seebold
Attys

July 9, 1940.　　　　　E. ROSENBERG　　　　2,207,304
SECURING CORRECT POLARITY OF GENERATORS
Filed April 12, 1937　　　2 Sheets-Sheet 2

Inventor
E. Rosenberg
By Glascock Downing & Seebold
Attys.

Patented July 9, 1940

2,207,304

UNITED STATES PATENT OFFICE 2,207,304

SECURING CORRECT POLARITY OF GENERATORS

Emanuel Rosenberg, Weiz, Styria, Austria, assignor to "Elin" Aktiengesellschaft für Elektrische Industrie, Vienna, Austria Application April 12, 1937, Serial No. 136,496
In Austria April 16, 1936

10 Claims. (Cl. 171—227)

Application has been filed in Austria April 16, 1936.

The present invention relates to direct current generators wherein the magnetic circuit is so arranged as to provide and maintain a given polarity at the terminals of the machine.

Certain types of continuous current generators are subject to the danger of reversal of polarity in service and this is particularly the case in series excited welding generators and exciters belonging to this class. The reversal of polarity occurs with series excited welding machines, if the machine by mistake is connected in parallel with another source of current, for instance another welding machine of higher voltage. Then, a current in a reverse direction passes through the series winding. With many machines a sudden short circuit causes a reversal of polarity as a result of the preponderance of armature reaction. A reversal of polarity of an exciter can occur if the field current is quickly reduced, because the selfinduction of the field of the main generator maintains in the armature of the exciter a current with great armature reaction. There are other reasons causing a reversal of polarity.

To use a permanent magnet for the whole magnet system or the pole pieces would be of no avail if the current causing the reversal of polarity is strong enough to overpower the coercive force of the magnet system.

The present invention provides in a part of the magnetic field a permanent magnet and a magnetic shunt. The permanent magnet has a greater coercive force than the whole of the other magnetic system so as to enable the permanent magnet to establish correct polarity of the machine even if it has been magnetized beforehand in the wrong direction by means of a large current. The section of the permanent magnet must be big enough so that a sufficiently great number of lines of forces of correct polarity are sent into the armature even after deducting all leakage lines particularly those that pass through the magnetic shunt.

Figure 1:
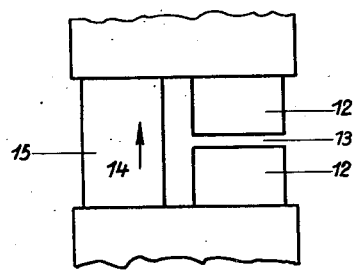
Figure 2:
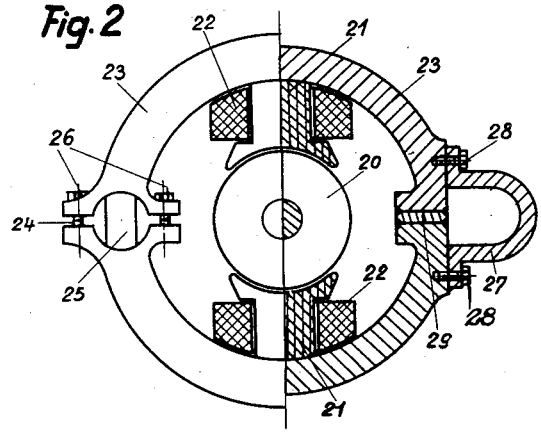
Figure 3:
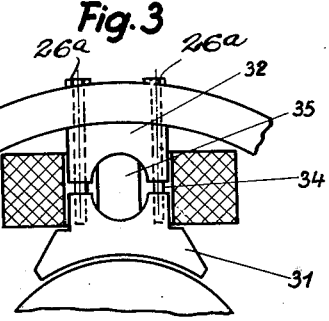
Figure 8:
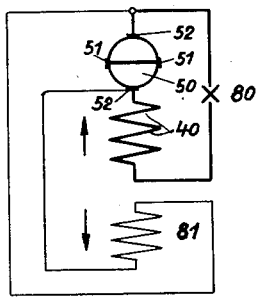
Figure 9:
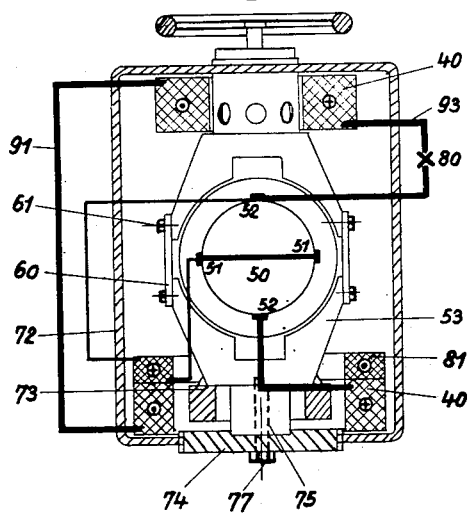
Figure 10:
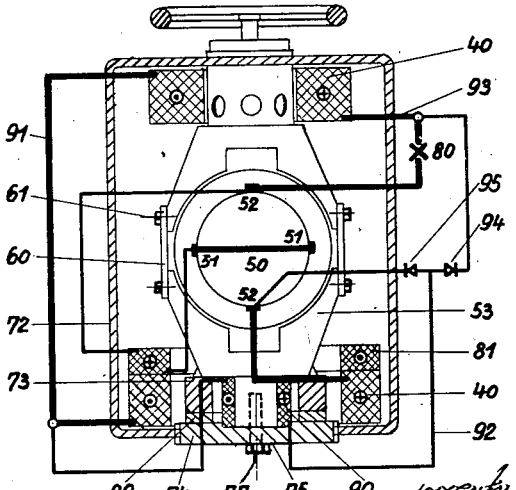

The accompanying drawings illustrate the invention. Fig. 1 is a simplified diagram of the invention. Figs. 2 and 3 illustrate a general application of the invention, while Figs. 4 to 7 show the application of the invention to crossfield machines. Fig. 8 is a diagram of connections for limiting the no-load voltage of a crossfield machine, to which the invention is applied. Fig. 9 is a combination of Figs. 7 and 8. Fig. 10 shows an auxiliary coil exciting the permanent magnet.

In Fig. 1 the invention is shown diagrammatically. 15 is a permanent magnet while 12 is a shunt consisting of soft iron preferably provided with an air gap 13. The air gap may also be filled with non-magnetic material for instance brass or non-magnetic steel which may be welded. It may be assumed that the permanent magnet is passed by lines of force in the upward direction of arrow 14.

If the unexcited machine has correct polarity from the last time of working, the coercive force of the permanent magnet will work in the same direction as the residual magnetism of the other parts of the magnetic field. Through the magnetic shunt 12 part of the lines of force produced by the permanent magnet will pass in downward direction.

If the machine is correctly excited in service, lines of force will pass in the magnetic shunt 12 in an upward direction.

If the machine is improperly polarized, for instance by an erroneous parallel connection, the magnetic shunt 12 is passed by the sum of the lines of force caused by the permanent magnet 15 and those of the remainder of the magnetic system.

When the machine is disconnected (after a reversal of polarity) at first all the soft iron parts of the remainder of the magnetic circuit are magnetized in a wrong direction. Then the flux of the permanent magnet is divided into 2 components, one of which is completed through the magnetic shunt 12, while the other passes through the remainder of the magnetic system and is strong enough to overpower the residual magnetism of the other parts of the magnetic field.

The leakage flux has an effect similar to the magnetic shunt.

Suppose that there are 12000 lines of force per square centimeter of the air gap 13 of the magnetic shunt, this would require approximately 1000 ampere turns for each millimeter length of the air gap. If the magnet 15 is required to give a higher coercive force, a bar made of very good material and several centimeters long is required or an even longer bar of magnetic material of moderate qualities.

The arrangement shown diagrammatically in Fig. 1 of the drawings, may be used in different parts of the magnetic field. Several examples of construction are shown in Figs. 2 to 7 of the drawings.

Fig. 2 shows a two pole machine which may be used as exciter. An armature 20, the pole pieces 21 and the field coils 22 are conventional. The yoke 23 is split horizontally. In the left half of the drawings the horizontal air gap 24 between the two halves of the yoke is bridged over by a magnetic bar 25. Screws 26 of non-magnetic material are employed to secure the two halves of the yoke to each other.

In the right half of the drawings the air gap is filled in by a plate 29 of non-magnetic steel which is welded to the two halves of the yoke.

To bridge over the air gap a horse shoe magnet 27 is used which has greater length, therefore greater coercive force, than a straight bar of the same material. Screws 28 are used for fixing the horse shoe magnet to both parts of the yoke.

In Fig. 3 a magnet bar 35 is arranged between the two parts 31 and 32 of a pole piece which otherwise are separated by an air gap 34. The two parts of the pole piece may be attached to the yoke by means of screws 26a.

Figure 4:
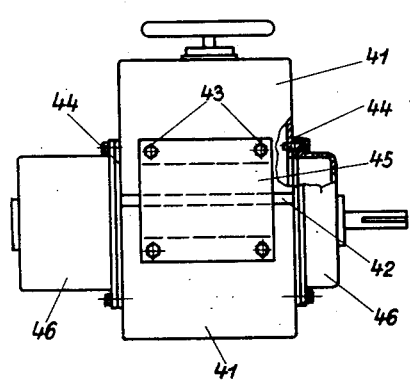
Figure 5:
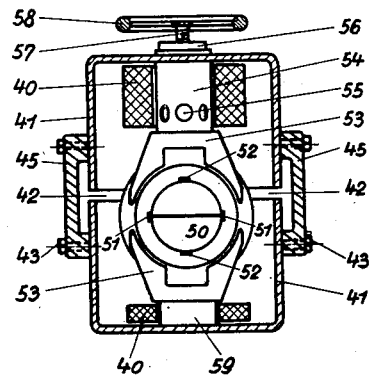

Figs. 4 and 5 illustrate the application of the invention to a cross-field machine with series excitation which is frequently used for welding purposes. The armature 50 has a set of brushes 51 which are short circuited and main brushes 52. The pole pieces 53 have a shape well known in a cross-field machine. The upper pole 54 is used as a regulating pole in as much as a piston shaped part 56 can be shifted in a cup shaped part provided with openings 55 by means of a screw 57 and a handwheel 58. The lower pole 59 and the upper pole 54 are surrounded by series coils 40. The magnet yoke 41 is horizontally split to provide an air gap 42. This air gap is bridged over on both sides by plates 45 of hard magnetic steel, and attached to the two halves of the yoke by means of screws 43. Rings 44 of non-magnetic steel are used to separate the bearing brackets 46 from the yoke in such a way that no magnetic short circuit of the flux is created by the bearing brackets.

Figure 6:
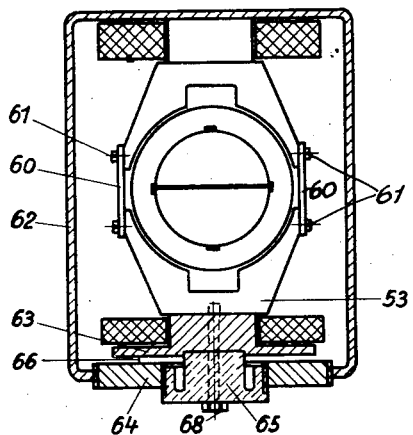
Figure 7:
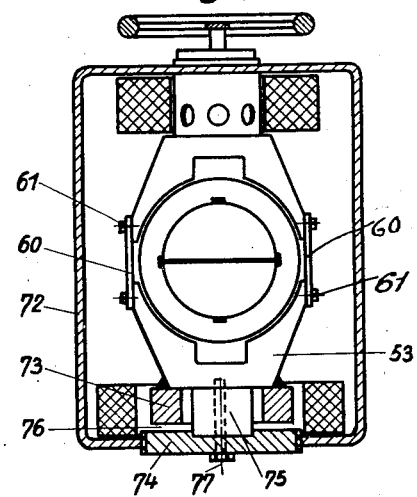

In Figs. 6 and 7 constructional forms of the invention are shown in application to cross-field machines with and without regulating poles, the invention not being applied to the yoke but to a part of the lower pole. In one case a straight magnet bar, in the other case a bell shaped magnet is used which is magnetized in such a way that, for instance, the inner part is a north pole and the outer part a south pole. The lower pole may be mechanically fixed to the upper pole to secure its position in the machine, for instance through non-magnetic plates 60 and screws 61.

In Fig. 6, the pole piece 53 is secured to a plate shaped part 63 shown in the drawings. Parallel to the plate shaped part 63 and separated by the air gap 66 is iron ring 64 which makes connection between the permanent magnet 65 and the yoke 62. The ring 64 is provided with threads at the periphery which permit a variation of the air gap 66. The bell shaped permanet magnet 65 is secured to the plate 63 by a screw 68, providing a second mechanical connection which fixes the position of the lower pole.

In Fig. 7, a cylindrical permanent magnet 75 is employed. The piece 73 is made of soft iron and is welded to the pole piece 53. Opposite to the piece 73 there is an iron plate 74, which is screwed into the magnet yoke 72. The air gap 76 may be adjusted, for instance by putting iron washers between the plate 74 and the permanent magnet 75 or between the pole piece 53 and the piece 73. The permanent magnet 75 and the pole piece 53 may be additionally secured to each other by a screw 77 penetrating through the plate 74.

If the air gap is made variable it is permissible to use a permanent magnet of very high coercive force because superfluous lines of force of the permanent magnet can be shunted by reducing the air gap, such a way that the lines passing through the remainder of the magnetic field and the armature may not reach too high a value, thus keeping the no-load voltage of the machine within desirable limits.

Another means to keep the no-load voltage within moderate limits consists in the application of a demagnetizing shunt coil which is connected either to the main brushes or to one of the main brushes and one of the auxiliary brushes. In generators for extraction machines for mines a similar arrangement is known under the name of "suicide connection." The diagram of connection is shown in Fig. 8 of the drawings while Fig. 9 illustrates the combination of Figs. 7 and 8.

The load current is taken from the brushes 52 and passes through the series winding 40 into an arc 80. The opposing winding 81 is connected to the main brushes 52 as shown in Fig. 8 or to one main brush 52 and an auxiliary brush 51 as illustrated in Fig. 9. The opposing winding is dimensioned to provide only a small percentage of the ampere turns of the main winding and has therefore only a small influence on the current in service.

The permanent magnet is dimensioned to carry a number of lines of force sufficient to cause correct polarity of the machine. This is only a small part of the total flux occurring when the machine gives full voltage in regular service or when it is connected to an outside source of voltage. The magnetic shunt therefore is dimensioned for a far greater flux than the permanent magnet. If the machine is functioning correctly in service, the flux in a certain direction will not be appreciably smaller than the flux in reverse direction which condition will occur if the magnetism is reversed from an outside source.

During inadvertent reversals of polarity there is a tendency to weaken the permanent magnet. On the other hand, during the far more frequent cases of correct service, the potential difference in the magnetic shunt has a tendency to strengthen the permanent magnet and therefore there is no danger that a weakening of the magnet will result from continued use of the machine.

If, however, a considerable weakening of the magnet should occur, it is possible, with several of the illustrated arrangements, to exchange the permanent magnet for a new one, without dismantling the machine.

In all the arrangements of Figs. 4 to 7 the device for securing correct polarity is only applied in the primary field of the cross-field machine, although in service the polarity of the secondary field may also be reversed. Experiments, however, have shown that it is not necessary to make special arrangements in the secondary field because the required polarisation of the secondary field takes place by itself in service if the arrangement in the primary field is correctly dimensioned.

To insure that the permanent magnet is not weakened, it may be surrounded by a coil which is connected to the main circuit in such a way, that only current of the desired direction passes through it. For instance, it may be connected either to two armature brushes or in parallel to the main series windings by means of a combination of electric valves. The latter arrangement is shown in Fig. 10. One end of the coil 90 is connected to a wire 91 connecting the upper and lower field coils and the other end 92 is connected by means of the electric valve 94 to the end 93 of the upper coil 40 and by means of the valve 95 to the lower brush 52, which is connected to the end of the lower coil 40. Each valve allows the current to flow in one direction only so as to strengthen the permanent magnet 75. Even while the machine is accidentally connected to an outside source of higher potential causing a high reversed current the permanent magnet will be strengthened.

What I claim is:

1. In a dynamo electric machine, a field magnet, field poles, a field coil and an auxiliary permanent magnet combined with a magnetic shunt in parallel to it as part of the field magnet circuit, so dimensioned that the permanent magnet combined with magnetic shunt send, if the field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs.

2. In a dynamo electric machine of the cross-field type, a field magnet, field poles, a series field coil and an auxiliary permanent magnet combined with a magnetic shunt in parallel to it as part of the field magnet circuit, so dimensioned that the permanent magnet combined with the magnetic shunt send, if the field coil carries no current, through the other part of the field magnet circuit into the armature a flux in a certain direction and that a reverse flux caused by outside influence is shunted through the magnetic shunt with such low differences of potential that no reversal of polarity or dangerous weakening of the permanent magnet occurs.

3. In an arc welding dynamo electric machine, a field magnet, field poles, a field coil and an auxiliary permanent magnet combined with a magnetic shunt in parallel to it as part of the field magnet circuit so dimensioned, that the permanent magnet combined with the magnetic shunt send, if the field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs.

4. In an arc welding dynamo of the cross-field type, a field magnet, field poles, a series field coil and an auxiliary permanent magnet combined with a magnetic shunt in parallel to it as part of the field magnet circuit, so dimensioned that the permanent magnet combined with the magnetic shunt send, if the field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs.

5. In a dynamo electric machine, a field magnet, field poles, a main exciting series field coil, an opposing shunt field coil and an auxiliary permanent magnet combined with a magnetic shunt in parallel to it as part of the field magnet circuit, so dimensioned that the permanent magnet combined with the magnetic shunt send, if the series field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs.

6. In a dynamo electric machine of the cross-field type, a field magnet, field poles, a main exciting series field coil, an opposing shunt field coil and an auxiliary permanent magnet combined with a magnetic shunt in parallel to it as part of the field magnet circuit, so dimensioned that the permanent magnet combined with the magnetic shunt send, if the series field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs.

7. In a dynamo electric machine, a field magnet, field poles, a field coil, an auxiliary permanent magnet combined with a magnetic shunt in parallel to it as part of the field magnet circuit, so dimensioned that the permanent magnet combined with the magnetic shunt send, if the field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs, an auxiliary coil wound on said permanent magnet and means to send current through said coil only in such direction as to strengthen the permanent magnet.

8. In a dynamo electric machine, a field magnet, field poles, a field coil, an auxiliary permanent magnet combined with a magnetic shunt in parallel to it as part of the field magnet circuit, so dimensioned that the permanent magnet combined with the magnetic shunt send, if the field coil carries no current, through the other part of the field magnet circuit into the armature a flux in a certain direction and that a reverse flux caused by outside influence is shunted through the magnetic shunt with such low difference of potential that no reversal of polarity or dangerous weakening of the permanent magnet occurs, and a regulating device for varying the iron section in one part of the field magnet circuit.

9. In a dynamo electric machine, an armature, a non-permanent field magnet with a field coil, and a combination of a permanent magnet with a magnetic shunt, said combination forming with said non-permanent field magnet a series connection for the main magnetic flux of the machine.

10. In a dynamo electric machine, an armature, a non-permanent field magnet with a field coil, the combination of a permanent magnet arranged in such a manner that it can be replaced without dismantling the machine with a magnetic shunt, said combination forming with said non-permanent field magnet a series connection for the main magnetic flux of the machine.

EMANUEL ROSENBERG.